(12) United States Patent
Shaffer et al.

(10) Patent No.: US 6,370,163 B1
(45) Date of Patent: Apr. 9, 2002

(54) APPARATUS AND METHOD FOR SPEECH TRANSPORT WITH ADAPTIVE PACKET SIZE

(75) Inventors: Shmuel Shaffer, Palo Alto; William Joseph Beyda, Cupertino, both of CA (US)

(73) Assignee: Siemens Information and Communications Network, Inc., Boca Raton, FL (US)

(*) Notice: Subject to any disclaimer, the term of this patent is extended or adjusted under 35 U.S.C. 154(b) by 0 days.

(21) Appl. No.: 09/041,468

(22) Filed: Mar. 11, 1998

(51) Int. Cl.$^7$ .............................. H04L 12/26; H04J 3/06
(52) U.S. Cl. .................. 370/519; 370/231; 370/235
(58) Field of Search .................. 370/252, 254, 370/231, 238, 229, 235, 236, 245, 445, 473, 493, 508, 519

(56) References Cited

U.S. PATENT DOCUMENTS

| | | | |
|---|---|---|---|
| 4,507,777 A | | 3/1985 | Tucker et al. ............... 370/16 |
| 4,771,391 A | | 9/1988 | Blasbalg .................... 364/514 |
| 5,063,562 A | * | 11/1991 | Barzilai et al. ............ 370/94.1 |
| 5,193,151 A | | 3/1993 | Jain ........................... 395/200 |
| 5,289,498 A | * | 2/1994 | Hurlbut et al. ............... 375/1 |
| 5,418,849 A | * | 5/1995 | Cannalire et al. .......... 379/410 |
| 5,477,531 A | * | 12/1995 | McKee et al. ............... 370/17 |
| 5,490,168 A | | 2/1996 | Phillips et al. ............. 375/224 |
| 5,668,951 A | * | 9/1997 | Jain et al. ............. 395/200.65 |
| 5,726,984 A | * | 3/1998 | Kubler et al. .............. 370/349 |
| 5,931,961 A | * | 8/1999 | Ranganathan et al. ...... 714/712 |
| 5,941,951 A | * | 8/1999 | Day et al. ................... 709/233 |
| 5,987,493 A | * | 11/1999 | Rangan et al. .............. 709/105 |
| 6,011,590 A | * | 1/2000 | Saukkonen ................. 348/419 |

OTHER PUBLICATIONS

WO 97/27692, Blair, William A., Internet Telecommunications System, PCT, pp. 1–39, Jul. 1997.*

* cited by examiner

Primary Examiner—Dang Ton
Assistant Examiner—Toan Nguyen (57) ABSTRACT

A system and method for adaptive packet-length IP telephony includes a first IP telephony communication device located on a data network and enabled to establish an IP telephony connection to a second IP telephony communication device. Optionally, the first communication device is enabled to access network topology information from a server regarding a network segment connecting the first and second communication devices. If the network topology reflects the presence of a low efficiency router on the network segment, the first communication device enters a fixed packet-length operational mode. If the network topology indicates an absence of a low efficiency network router on the segment, the first communication device enters an adaptive packet-length operational mode. In the adaptive packet-length operational mode, prior to establishing the IP telephony connection, the first communication device determines an end-to-end transmission delay by transmitting a test packet to the second communication device with instructions to return a first acknowledgment message. Based on the first end-to-end transmission delay, a control program associated with the first communication device calculates a permissible packet length for IP telephony packets transmitted from the first communication device to the second communication device via the IP telephony connection. After establishment of the IP telephony connection, the first communication device transmits a second test packet which generates a second end-to-end transmission delay data set. Based on the second data set, the control program calculates a second permissible packet length.

18 Claims, 4 Drawing Sheets

APPARATUS AND METHOD FOR SPEECH TRANSPORT WITH ADAPTIVE PACKET SIZE

BACKGROUND OF THE INVENTION

The present invention relates generally to a system and method for transmitting voice over data networks, and more particularly, the invention relates to a method and system for adaptive packet-length speech transport over a data network based on end-to-end transmission delay.

DESCRIPTION OF THE RELATED ART

A local area network (LAN) is a communication system capable of transferring data among multiple communication devices. LAN architectures permit multiple devices to connect to a common physical link such that each device is capable of communicating with all other devices on the common link. Data is transferred among the devices on the LAN in packets which include a variable length information field, or payload, and addressing fields.

Control access mechanisms regulate access by the devices to the LAN for transmission of data packets. For instance, carrier sense multiple access collision detection (CSMA/CD) is an access method which employs collision avoidance and collision detection techniques. A first device preparing to transmit a packet over the LAN senses whether a carrier signal is present on the LAN which indicates that a second device on the LAN is transmitting. The first device waits until the second device has completed its transmission, that is, until the carrier signal has been removed, before transmitting the packet. After the packet has been transmitted, the first device monitors the network to determine if a collision has occurred. If a collision occurs, the first device perceives the collision and retransmits the packet because the collision has compromised the data in the packet.

One of the primary concerns affecting voice and video transmission over a data network such as a LAN is the effect of end-to-end transmission delay on the quality of speech and image presentation in the communication device receiving voice and video information in data packets. In internet protocol (IP) telephony, analog voice signals are converted to digital signals, and subsequently the digital signals are compressed and packetized for transmission from a first IP telephony device to a second IP telephony device. The end-to-end transmission delay can disrupt effective communication by preventing a natural flow to a telephone conversation. Network traffic and the presence of routers on the connection between the first and second devices both contribute to the end-to-end transmission delay.

A distributed control apparatus described in U.S. Pat. No. 4,771,391 to Blasbalg maintains network stability in a LAN under changing network traffic conditions by adjusting the packet size transmitted by devices on the LAN in response to changing network traffic levels. The apparatus monitors the serial bit rate of traffic flowing on the network segment on which the device resides. The apparatus adaptively adjusts the packet length of data it transmits such that in high traffic periods the device transmits packets of a longer length than in periods of low traffic. Each device on the network employs the same adaptive packet size strategy so that under increased traffic load conditions the network is able to support increased throughput and network stability is maintained.

Although the distributed control apparatus is effective for its intended purpose of maintaining network stability, the apparatus does not operate to maintain a low end-to-end transmission delay between two devices on a LAN. In times of high network traffic when end-to-end delay is already high, the longer packets which the distributed control apparatus transmits increases end-to-end delay, because the longer packets require more extensive processing time than shorter packets. Furthermore, the distributed control apparatus does not take into account the delay caused by routers located on the connection between two IP telephony devices.

What is needed is a system and a method for speech transport over a data network which minimizes end-to-end delay caused by network traffic and network topology between two IP telephony devices.

SUMMARY OF THE INVENTION

A method for adaptive packet-length speech transport over a data network includes establishing a communication link between a first communication device and a second communication device over the data network. An end-to-end transmission delay between the first and second communication devices is determined and a permissible packet length for transmission of data over the communication link is calculated based on the end-to-end delay and a predetermined delay tolerance. The permissible packet length is calculated based on an inverse correlation between end-to-end delay and permissible packet length, such that calculations of short permissible packet lengths are associated with determinations of long end-to-end delays. Data is transmitted over the communication link from the first communication device to the second communication device in packets having a length conforming to the permissible packet length.

The determination of end-to-end transmission delay includes obtaining network topology data from a server device, the data including an end-to-end transmission delay attributed to the network topology. The network topology data is derived by comparing an address of the first communication device to an address of the second communication device to determine whether a low efficiency router is located on the network segment connecting the first and second communication devices. If the network topology data indicates the presence of a low efficiency router on the network segment, the first communication device responds by entering a fixed packet-length operational mode. If the network topology indicates the absence of a low efficiency router in the connection, the first communication device enters an adaptive packet-length operational mode.

If the first communication device enters the adaptive packet-length operational mode, it transmits a test packet with instructions to the second communication device to return a first acknowledgment message. The first communication device calculates the end-to-end transmission delay based on the time interval between transmission of the test packet and receipt of the acknowledgment message. The end-to-end transmission delay is utilized to determine a permissible packet length for transmission of voice data.

In a preferred embodiment, the method includes determining a second end-to-end transmission delay after the connection between the first and second communication devices has been established by transmitting a second test packet from the first communication device to the second communication device and receiving a second acknowledgment from the second communication device which includes a second end-to-end transmission delay data set.

A system for speech transport with adaptive packet length includes a first IP telephony communication device having a fixed packet-length operational mode and an adaptive packet-length operational mode, the first IP telephony communication device being enabled to establish an IP telephony connection with a second IP telephony communication device. The first communication device is located on a data network and is enabled to access end-to-end transmission delay data pertaining to the IP telephony connection between the first and second communication devices. The first communication device is further enabled to transmit IP telephony packets of a length based upon the end-to-end transmission delay while in the adaptive packet-length operational mode.

A call control program in communicative contact with the first communication device is configured to calculate a permissible packet length for the IP telephony packets based on the end-to-end transmission delay data accessed by the first communication device.

A preferred embodiment of the system includes a server from which the first communication device is able to access information regarding a network topology of the network segment between the first and second communication devices. The network topology data informs the first communication device whether a low efficiency router is located on a network segment connecting the first and second communication devices. The first communication device is configured to enter the adaptive packet-length operational mode in response to topology data indicating an absence of a low efficiency router on the network segment.

The first communication device is configured to access the end-to-end transmission delay data by transmitting a first test packet to the second communication device during the establishment of the IP telephony connection with instructions directing the second communication device to return an acknowledgment message immediately upon receipt of the test packet. Upon receiving the acknowledgment message, the first communication device is configured to calculate an approximate end-to-end delay by dividing the time interval between transmission of the test packet and receipt of the acknowledgment message in half. In a preferred embodiment, the processing delay introduced by the second communication device prior to transmission of the acknowledgment message is taken into account in calculating the end-to-end delay.

In an alternative embodiment, the first test packet includes instructions to the second communication device to return a first end-to-end delay data set, the first and second communication devices both including synchronized clocks. The second communication device is capable of determining the end-to-end delay based on a comparison of a time stamp included in the first test packet and the time at which the first test packet arrived. The first end-to-end transmission delay data set reflects a travel time elapsed between the departure of the first test packet from the first communication device and the arrival of the first test packet at the second communication device.

The first communication device is also able to transmit a second test packet to the second communication device after the IP telephony connection is established and the telephone conversation is in progress. The second test packet enables the first communication device to determine a current end-to-end transmission delay. The call control program calculates an updated second packet length for IP telephony packets based on the current end-to-end transmission delay.

DETAILED DESCRIPTION

Figure 1:
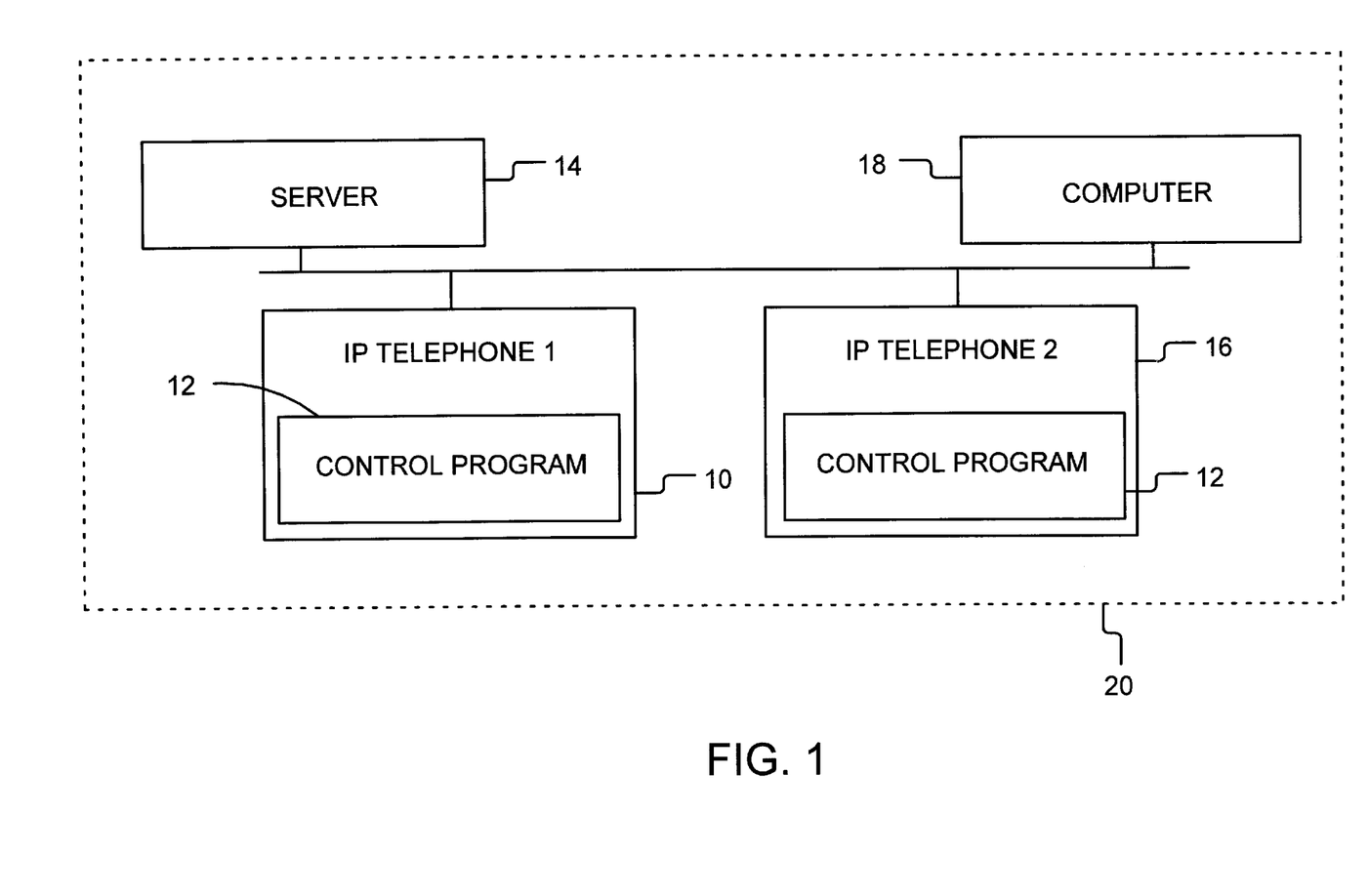
FIG. 1 is a block diagram of a LAN employing a system for transporting speech of the present invention.

A system for transporting speech over a data network such as a LAN 20 of FIG. 1 includes first and second IP telephones 10 and 16 with a call control program 12, a server 14 and a computer 18. The server 14 is shown as a stand alone device. However, the server function can be incorporated into either the first or second IP telephone 10 or 16, or both. Furthermore, the IP telephones 10 and 16 can be multi-functional devices such as IP telephony-enabled computers. An alternate network such as a metropolitan area network (MAN) can be substituted for the LAN 20. The LAN 20 is shown supporting a relatively small number of communication devices for the sake of simplicity. However, a greater number of communication devices, such as additional computers and IP telephones, fax machines, and printers can be attached to the LAN 20.

In a preferred embodiment, the first and second IP telephones 10 and 16 operate according to the H.323 standard promulgated by the International Telecommunication Union (ITU). Both the first and second IP telephones 10 and 16 can be enabled for video teleconferencing as well as voice communication. In the process of establishing an IP telephony connection to the second IP telephone 16, the first IP telephone 10 is configured to determine an end-to-end transmission delay of the LAN segment connecting the first and second IP telephones 10 and 16.

In a preferred embodiment, the first telephone 10 accesses network topology data for the LAN segment connecting the first and second IP telephones 10 and 16 by transmitting a topology query to the LAN server 14. The topology query includes the addresses of both the first and second IP telephones 10 and 16. The server 14 is configured to execute an auto-discovery of the network segment delimited by the first and second IP telephones 10 and 16 to determine whether a low efficiency router is present between the first and second telephones 10 and 16. The server 14 must be able to distinguish between a high efficiency router and a low efficiency router because the low efficiency router introduces higher and more variable latency into the network than the high efficiency router. For example, a low efficiency router that uses software-based switching causes an exponential latency increase as network traffic increase. In contrast, a high efficiency router which utilizes layer 3 hardware switching causes an approximately linear increase in latency as network traffic increases.

The first IP telephone 10 responds to the network topology information received from the server 14 by either entering a fixed packet-length operational mode or an adaptive packet-length operational mode. If the network topology information indicates that a low efficiency router is located on the LAN segment, the first IP telephone 10 is configured to enter the fixed packet-length operational mode in which the first IP telephone 10 transmits short IP telephony packets. If the network topology information indicates that a high efficiency router or no router is located on the network segment, the first IP telephone 10 is configured to enter an adaptive packet-length operational mode.

In one alternative embodiment, the first IP telephone 10 is configured to enter the adaptive packet-length operational mode even if a low efficiency router is located on the network segment between the first and second IP telephones 10 and 16. However, the first IP telephone 10 is configured to transmit test packets at a higher frequency and/or provide a larger safety factor in calculating packet length to accommodate the low efficiency router's volatile latency. In another alternative embodiment, the first IP telephone 10 dispenses with accessing network topology data and operates in the adaptive packet-length mode continuously.

In FIG. 1 no router is located on the LAN 20, so the first IP telephone 10 enters the adaptive packet-length operational mode. To determine a permissible packet length, the first IP telephone 10 transmits a test packet to the second telephone 16 together with instructions directing the second IP telephone 16 to transmit an acknowledgment message to the first IP telephone 10. The first IP telephone calculates an end-to-end transmission delay by dividing the time interval between transmission of the test packet and receipt of the acknowledgment message in half. The time interval is then adjusted for a processing delay caused by the second IP telephone prior to transmitting the acknowledgment message. In the absence of a router between the first and second IP telephones 10 and 16, the end-to-end transmission delay is a function of the network traffic on the LAN 20.

The end-to-end transmission delay results in part from the fact that only one communication device at a time is permitted to transmit data over the LAN 20, because simultaneous transmissions can lead to collisions which compromise the data being transmitted. For instance, if the computer 18 is downloading a file from the server 14 when the first IP telephone 10 attempts to transmit an IP telephony packet, the first IP telephone 10 must wait until the server 14 has finished transmitting the file to the computer 18 before transmitting the packet to the second IP telephone 16. Although the delay which results from the transmission from the server 14 to the computer 18 is relatively slight, on a LAN with numerous communication devices contending for access to the network, the delay can become significant.

The control program 12 in the first IP telephone 10 is configured to process the end-to-end transmission delay data to determine a permissible packet length for transmission of voice information. The control program 12 operates on the principle that voice information transmitted in short packets introduces less end-to-end delay than voice information transmitted in long packets. Transmission of a long IP telephony packet is delayed until the voice information to be transmitted is compressed and packetized. In contrast, shorter IP telephony packets contain a shorter interval of voice information. Consequently, the time interval between generation of voice information and the departure of voice information is smaller in short packets than in longer packets.

The control program 12 includes a maximum delay parameter which is used in calculating the permissible packet length for IP telephony packets. In a preferred embodiment, the maximum permissible delay is 100 milliseconds. The control program 12 also includes an inverse correlation between packet length and delay attributed to packet processing. Two additional parameters which the control program 12 includes are addressing field requirements and a safety factor. The addressing field requirements reflect the amount of routing data which must be included into a packet. The safety factor anticipates a fluctuation in network traffic and protects against exceeding the maximum permissible delay by setting the packet length at a predetermined percentage below the maximum permissible length.

Figure 3:
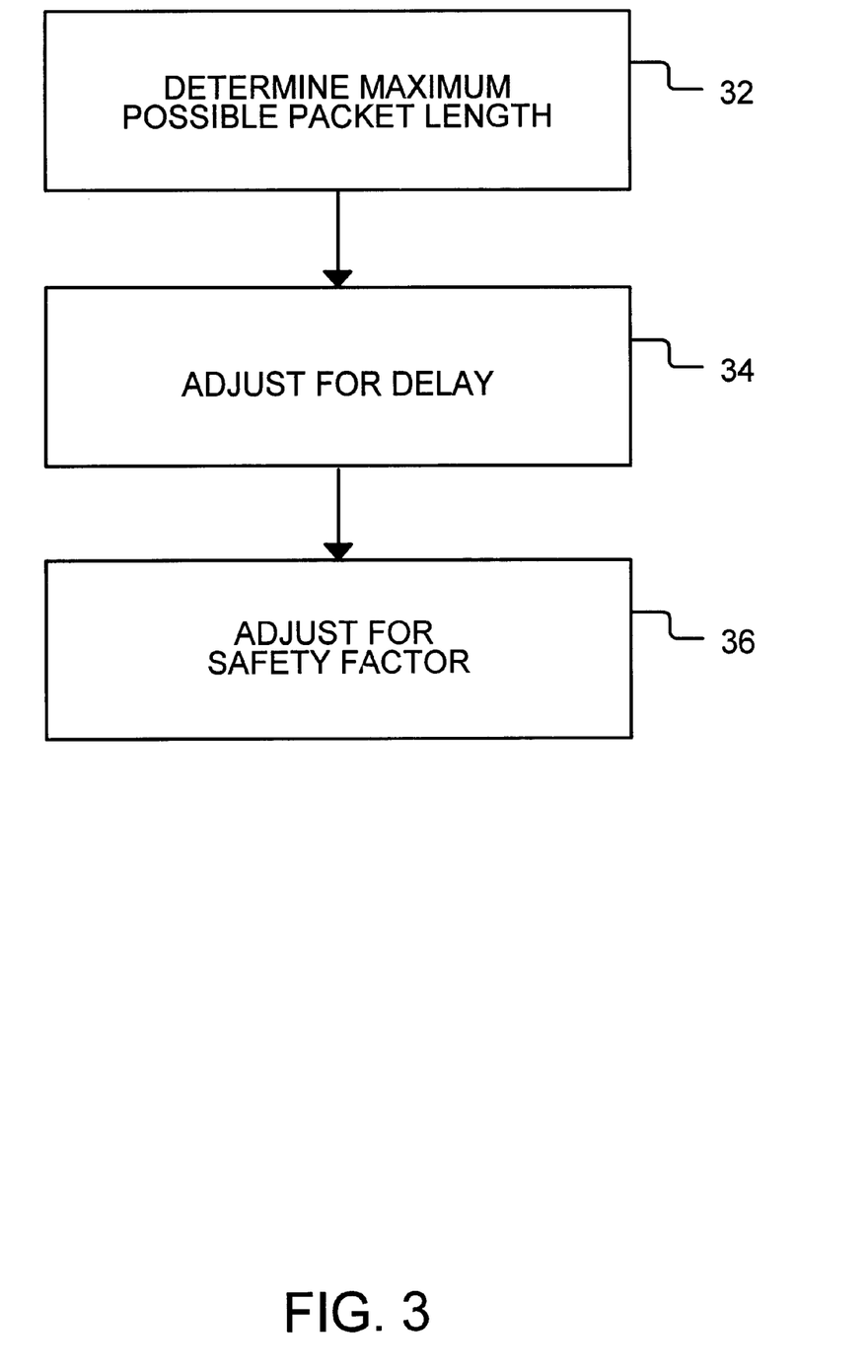
FIG. 3 is a flow diagram of a method for determining packet length utilizing the system for transporting speech shown in FIGS. 1 and 2.

Referring to FIG. 3, the control program 12 is configured to calculate a permissible packet length by determining 32 the maximum possible packet length absent any end-to-end delay. The maximum packet length is a function of how much voice information the first IP telephone 10 is capable of compressing and packetizing within the maximum tolerable end-to-end delay time interval, that is, 100 milliseconds. To account for the actual end-to-end delay determined by transmission of the test packet, the packet length is reduced 34 by the amount of voice information capable of being processed within the actual end-to-end delay time interval. The packet length is further reduced 36 by a safety factor to accommodate anticipated end-to-end delay fluctuation caused by fluctuation in the network traffic load. The control program 12 is configured to calculate the permissible packet length during the call setup process and at configurable time periods after the IP telephony connection is established.

The first IP telephone 10 is configured to transmit IP telephony packets of a length conforming to the permissible packet length once the call setup is complete. However, establishing a permissible packet length only during call setup is not sufficient to ensure effective IP telephony, especially for longer telephone conversations, because changing network traffic conditions effect end-to-end delay. Consequently, the first IP telephone 10 is configured to transmit additional test packets after establishment of the IP telephony connection at regular predetermined intervals to recalculate a permissible packet length taking into account the changed network traffic conditions. The safety factor can be adjusted as well if the fluctuation in network traffic is larger or smaller than the anticipated fluctuation on which the safety factor was based. Alternatively, the calculation of permissible packet length can be performed at a higher frequency if the fluctuation in network traffic is higher than anticipated.

Figure 2:
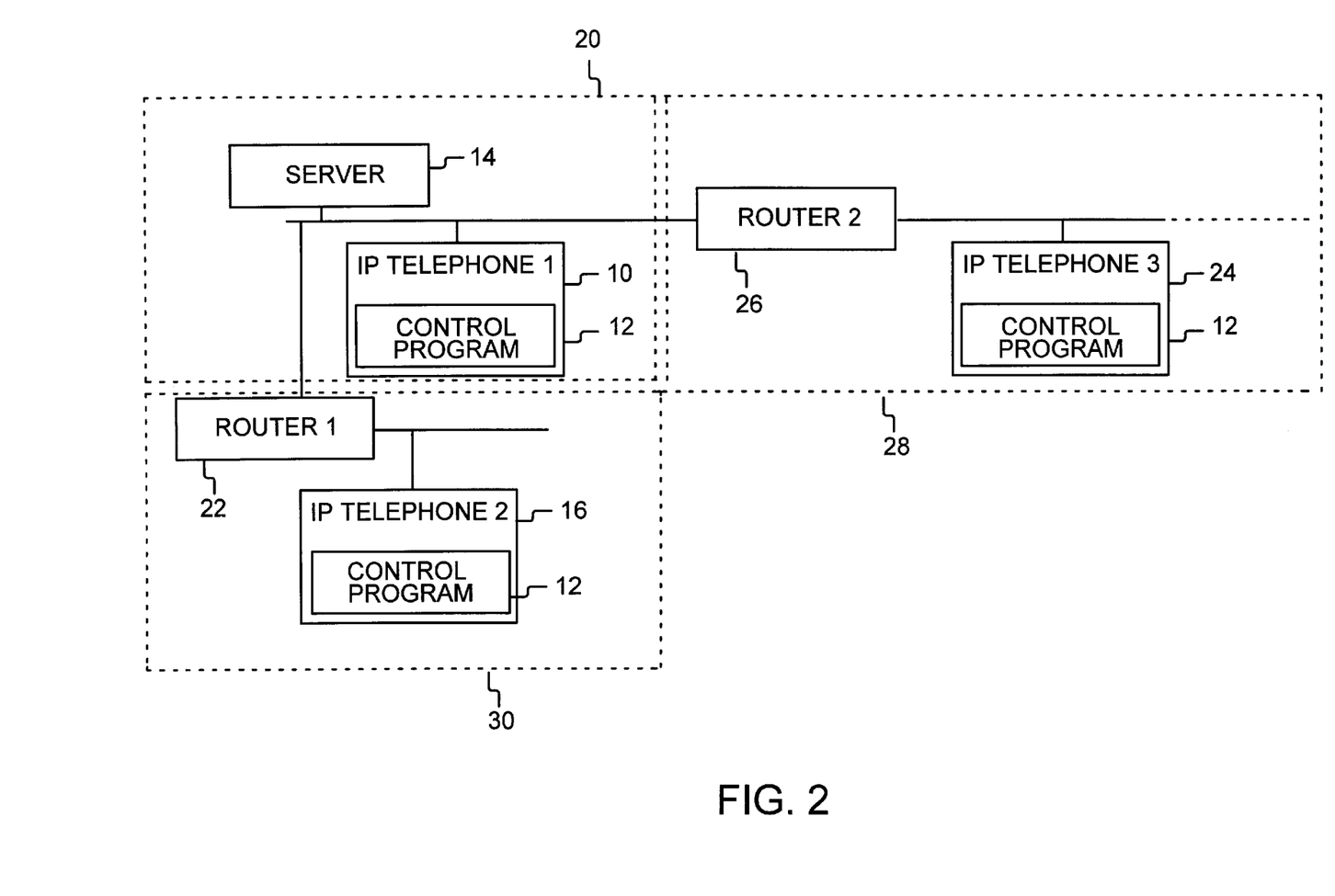
FIG. 2 is a block diagram of a system for transporting speech employed on a LAN with alternative configuration from the LAN shown in FIG. 1.

Referring to FIG. 2, a first LAN 20, second LAN 28, and third LAN 30 are connected by a first router 22 and a second router 26. The first router 22 is a high efficiency router that employs layer 3 hardware switching technology, and the second router 26 is a lower efficiency router that employs software to perform switching functions. To establish a call to a third IP telephone 24 on the second LAN 28, the first IP telephone 10 transmits a network topology query to the server 14. The server 14 responds by transmitting network topology data to the first IP telephone 10 which reflects the presence of the second low efficiency router 26 between the first and third IP telephones 10 and 24. Based on the network topology data, the first telephone 10 is configured to operate in a fixed packet-length mode wherein the first IP telephone 10 transmits IP telephony packets of a fixed length.

The ability of the server 14 to determine network topology is limited. For instance, if the first IP telephone 10 attempts to establish an IP telephony connection with an IP telephony-enabled device via multiple routers on remotely located LANs, the server 14 will most likely not have access to the network topology data between the two endpoints. The server 14 is likely to have access to network topology limited to a set of LANs in a relatively small geographical area, for instance an internetwork of LANs on a campus.

With continued reference to FIG. 2, if the first IP telephone 10 sets up a call to the second IP telephone 16 via the high efficiency first router 22, the first IP telephone 10 transmits a network topology query to the server 14. The first telephone 10 is configured to proceed in an adaptive packet length operational mode in response to the data reflecting the presence of the high efficiency router 22 between the first and second IP telephones. The first IP telephone 10 then transmits a test packet to the second telephone 16 to establish a permissible packet length as part of the call setup process.

Figure 4:
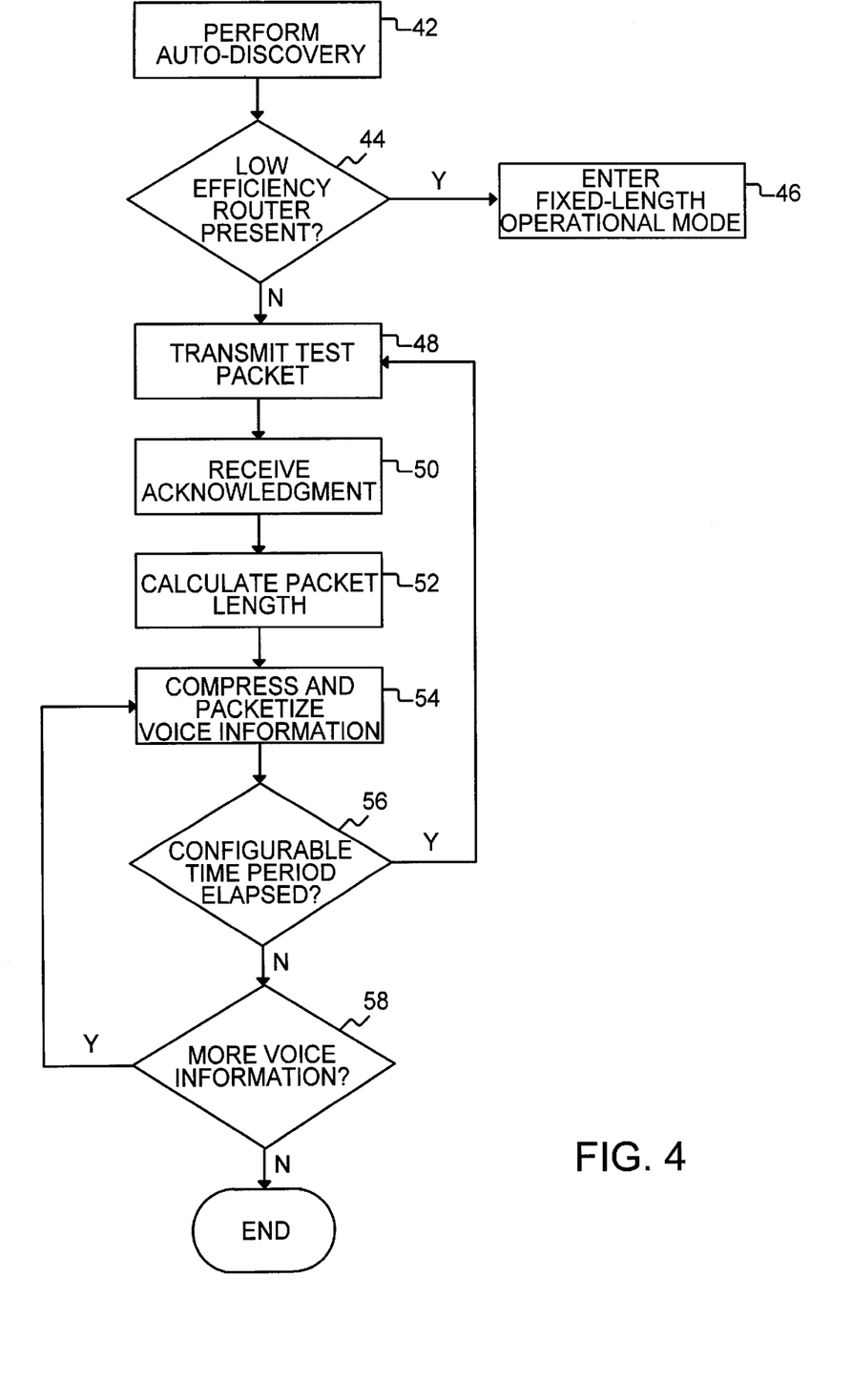
FIG. 4 is a flow diagram of a method for transporting speech over a data network utilizing the system of FIGS. 1 and 2.

Referring to FIG. 4, a method for adaptive packet length speech transport over a data network, such as a LAN, includes an optional step of transmitting a query including the layer 2 MAC addresses of the first and second IP telephones 10 and 16 from the first IP telephone 10 to the server 14 to obtain network topology data regarding the LAN segment connecting the first and second IP telephones. The server 14 performs 42 an auto-discovery to determine the network topology of the LAN segment. The first IP telephone 10 determines 44 whether to enter 46 the fixed packet-length operational mode or the adaptive packet-length operational mode based on the network topology. If the network topology reveals that a low efficiency router is located in the transmission path between the first and second IP telephones 10 and 16, the first IP telephone enters the fixed packet-length operational mode in step 46. Alternatively, the first IP telephone 10 operates continuously in the adaptive packet-length mode, in which case the steps of transmitting a network topology query and performing an auto-discovery are skipped.

If the network topology reveals that either a high efficiency router 22 or no router at all is located between the first and second IP telephones, the first IP telephone 10 enters an adaptive packet-length operational mode. To determine a permissible IP telephony packet length, the first IP telephone 10 transmits 48 a test packet to the second IP telephone with instructions to transmit an acknowledge message. The first telephone 10 calculates an end-to-end transmission delay based on the time interval between transmitting 48 the test packet and receiving the acknowledgment from the second IP telephone 16. In a preferred embodiment, the first IP telephone divides the time interval in half and adjusts for the delay caused by the second IP telephone 16 processing the acknowledgment message. The first IP telephone 10 utilizes a control program 12 to calculate 52 the permissible packet length based on the end-to-end transmission delay data.

Once the call setup process is complete and the IP telephony connection is established, the first telephone 10 compresses and packetizes 54 voice information to be transmitted to the second telephone 16 via the IP telephony connection. The length of the packets conforms to the permissible packet-length calculated by the control program 12. The first IP telephone 10 is configured to periodically transmit additional test packets at configurable time intervals after the IP telephony connection has been established to recalculate a permissible packet length taking into account any change in network traffic load. In step 56, the first IP telephone 10 determines whether a configurable time interval has elapsed. If the configurable time interval has elapsed, the first IP telephone 10 returns to step 48 and transmits a test packet. If the time interval has not elapsed, the first IP telephone determines 58 whether the IP telephony connection is still up and if more voice information needs to be transmitted. If more voice information needs to be transmitted, the IP telephone returns to step 54 to compress and packetize the voice information.

What is claimed is:

1. A method for adaptive packet-length speech transport over a data network comprising the steps of:

determining an end-to-end transmission delay between said first and second communication devices, including obtaining data from a server regarding a network topology of a network segment between said first and second communication devices;

calculating a permissible packet length for transmission of voice information over a voice-over-data-network connection between said first and second communication devices at least partially based upon said end-to-end transmission delay, said step of calculating including calculating said permissible packet length based on an inverse correlation between packet length and said determined end-to-end transmission delay such that calculations of short permissible packet lengths are associated with determinations of long end-to-end transmission delays, said inverse correlation being determined prior to said transmission of said voice information; and transmitting voice information over said voice-over-data-network connection from said first communication device to said second communication device in a first set of packets having a length conforming to said permissible packet length.

2. The method of claim 1 wherein said step of determining said end-to-end transmission delay occurs during said step of establishing said voice-over-data-network connection.

3. A The method of claim 1 wherein said step of determining said end-to-end delay includes comparing an address of said first communication device to an address of said second communication device to determine if said first and second communication devices are located on a same network segment of said network.

4. The method of claim 1 wherein said step of determining said end-to-end transmission delay includes transmitting a first test packet from said first communication device to said second communication device and receiving a first responsive acknowledgment from said second communication device.

5. The method of claim 4 wherein said step of determining said end-to-end delay includes calculating a time interval between said transmission of said test packet and said receiving said responsive acknowledgment, dividing said time interval in half, and adjusting for a processing time of said responsive acknowledgment.

6. The method of claim 4 wherein said step of determining said end-to-end delay includes receiving a first end-to-end delay data set with said responsive acknowledgment from said second communication device, said end-to-end transmission delay data set reflecting a time interval between a departure of said test packet from said first communication device and an arrival of said test packet at said second communication device.

7. The method of claim 4 wherein said step of calculating said permissible packet length includes:

establishing a predetermined end-to-end transmission delay tolerance for propagation of said first set of packets;

determining a maximum possible packet length based on said predetermined end-to-end delay tolerance;

adjusting said maximum possible packet length for said end-to-end transmission delay determined from said transmission of said first test packet, said adjusting being based on said inverse correlation between said selected permissible packet length and said determined end-to-end transmission delay; and further adjusting said maximum possible packet length for a safety factor, said safety factor requiring a reduction in packet size in anticipation of fluctuating data network traffic.

8. The method of claim 1 further comprising the steps of:

determining a current end-to-end transmission delay between said first and second communication devices after said step of establishing said voice-over-data-network connection by transmitting a second test packet from said first communication device to said second communication device and receiving a second responsive acknowledgment from said second communication device;

calculating a current permissible packet length for transmission of voice information over said voice-over-data-network connection between said first and second communication devices based at least partially on said current end-to-end transmission delay; and transmitting voice information over said voice-over-data-network connection between said first and second communication devices in a second set of packets having a length conforming to said current permissible packet length.

9. A system for adaptive packet-length speech transport over a data network comprising:

a first communication device having an adaptive packet-length operational mode, said first communication device being located on said data network and being enabled to establish a voice-over-data-network connection with a second communication device, said first communication device being configured to access end-to-end transmission delay data pertaining to a first network segment between said first and second communication devices, said first communication device further being configured to transmit a first voice data packet of a first length based upon said end-to-end transmission delay data while in said adaptive packet-length operational mode, said end-to-end transmission delay being based on adjusting for transmission time intervals both from said first to said second communication device and from said second to said first communication device, including utilizing data from a server that identifies a type of device on said first network segment; and a call control program in communicative contact with said first communication device, said call control program being configured to calculate a first permissible packet length for said first voice data packet transmitted from said first communication device via said voice-over-data-network connection, said first permissible packet length being based at least partially upon said end-to-end transmission delay data accessed by said first communication device.

10. The system of claim 9 wherein said first communication device is configured to transmit a first test packet to said second communication device during said establishment of said voice-over-data-network connection, said first test packet including instructions to return a first responsive acknowledgment message, said first communication device being further configured to calculate a first end-to-end transmission delay based on a time interval between said transmission of said first packet and receipt of said first responsive acknowledge message and an adjustment for a processing time for transmission of said first responsive acknowledge message from said second communication device.

11. The system of claim 10 wherein said first communication device is configured to transmit a second test packet to said second communication device after said establishment of said voice-over-data-network connection, said second test data packet including instructions to return a second acknowledge message, said first communication device being further configured to transmit a second voice data packet of a second length calculated by said call control program based at least in part on a second end-to-end transmission delay.

12. The system of claim 9 wherein said server is in communicative contact with said first communication device, said server being configured to discover a network topology of said first network segment between said first and second communication devices and a second network segment between said first communication device and a third communication device, said server being further configured to transmit first and second network topology data sets to said first communication device, said first network topology data set including said network topology of said first network segment reflecting an absence of a low efficiency router on said first network segment, said second network topology data set including a network topology of said second network segment reflecting a presence of said low efficiency router on said second network segment, said first communication device being configured to enter said adaptive packet-length operational mode in response to said first network topology data set and to enter a fixed packet-length operational mode in response to said second data set.

13. The system of claim 12 wherein said server is configured to differentiate between a high efficiency router and said low efficiency router, said high efficiency router causing a smaller end-to-end data transmission delay than said low efficiency router.

14. The system of claim 9 wherein said first communication device is enabled for video-teleconferencing over said voice-over-data-network connection with said second communication device.

15. A method for adaptive packet-length speech transport over a data network comprising the steps of:

establishing a voice-over-data-network connection between a first communication device and a second communication device via said data network;

determining whether a low efficiency router is located on a network segment between said first and second communication devices;

if it is determined that no low efficiency router is located on said network segment between said first and second communication devices, transmitting a first test packet from said first communication device to said second communication device via said network segment to determine a first end-to-end transmission delay over said network segment between said first and second communication devices;

calculating a first permissible packet length for transmission of voice data packets over said voice-over-data-network connection, said packet-length calculation occurring prior to said voice-over-data-network connection being established; and transmitting a first set of voice data packets from said first communication device to said second communication device via said voice-over-data-network connection, said voice data packets having a first length determined based at least partially upon said first end-to-end transmission delay.

16. The method of claim 15 further comprising the steps of:

transmitting a second test packet from said first communication device to said second communication device after said voice-over-data-network connection being established to determine a current end-to-end transmission delay on said network segment comprising said voice-over-data-network connection;

calculating a second permissible packet length based upon said current end-to-end transmission delay; and transmitting a second set of voice data packets from said first communication device to said second communication device based on said second permissible packet length.

17. The method of claim 15 further comprising the step of calculating an estimated intrinsic transmission delay based upon a network topology between said first and second communication devices.

18. The method of claim 15 wherein said step of establishing said voice-over-data-network connection between said first and second communication devices includes providing video-teleconferencing.

* * * * *